United States Patent [19]

Congdon

[11] Patent Number: 5,443,616
[45] Date of Patent: Aug. 22, 1995

[54] METAL HYDRIDE COMPOSITION AND METHOD OF MAKING

[75] Inventor: James W. Congdon, Aiken, S.C.

[73] Assignee: The United States of America as represented by the United States Department of Energy, Washington, D.C.

[21] Appl. No.: 91,013

[22] Filed: Jul. 14, 1993

[51] Int. Cl.⁶ .................. C22C 21/00; B22F 1/00
[52] U.S. Cl. .................. 75/240; 502/400; 502/407; 502/415; 420/900; 419/2; 419/23; 419/53; 75/247; 75/249
[58] Field of Search .......... 75/249, 246, 247; 420/900; 423/645, 658.2; 55/116; 252/188.25, 188.26; 502/400, 415, 407; 419/2, 5, 23, 33, 43, 53

[56] References Cited

U.S. PATENT DOCUMENTS

| | | | |
|---|---|---|---|
| 3,803,082 | 4/1974 | Roberts et al. | 423/644 X |
| 4,079,523 | 3/1978 | Sandrock | 34/15 |
| 4,173,625 | 11/1979 | Billings | 423/648 R |
| 4,249,654 | 2/1981 | Helversen | 423/648 X |
| 4,300,946 | 11/1981 | Simons | 75/0.5 B |
| 4,310,601 | 1/1982 | Bernauer et al. | 206/0.7 X |
| 4,360,569 | 11/1982 | Steyert et al. | 423/248 X |
| 4,389,239 | 6/1983 | Klatt et al. | 75/0.5 R |
| 4,431,561 | 2/1984 | Ovshinsky et al. | 423/648 X |
| 4,433,063 | 2/1984 | Bernstein et al. | 423/248 X |
| 4,507,263 | 3/1985 | Ron | 423/644 X |
| 4,600,525 | 7/1986 | Baker et al. | 423/648.1 X |
| 4,607,826 | 8/1986 | Ron | 266/251 |
| 4,687,650 | 8/1987 | Goodell et al. | 423/248 |
| 4,717,629 | 1/1988 | Ishikawa et al. | 423/644 X |
| 4,737,249 | 4/1988 | Shepard, Jr. et al. | 204/129 |

*Primary Examiner*—Ngoclan Mai
*Attorney, Agent, or Firm*—Brian R. Tumm; Harold M. Dixon; William R. Moser

[57] ABSTRACT

A dimensionally stable hydride composition and a method for making such a composition. The composition is made by forming particles of a metal hydride into porous granules, mixing the granules with a matrix material, forming the mixture into pellets, and sintering the pellets in the absence of oxygen. The ratio of matrix material to hydride is preferably between approximately 2:1 and 4:1 by volume. The porous structure of the granules accommodates the expansion that occurs when the metal hydride particles absorb hydrogen. The porous matrix allows the flow of hydrogen therethrough to contact the hydride particles, yet supports the granules and contains the hydride fines that result from repeated absorption/desorption cycles.

20 Claims, 2 Drawing Sheets

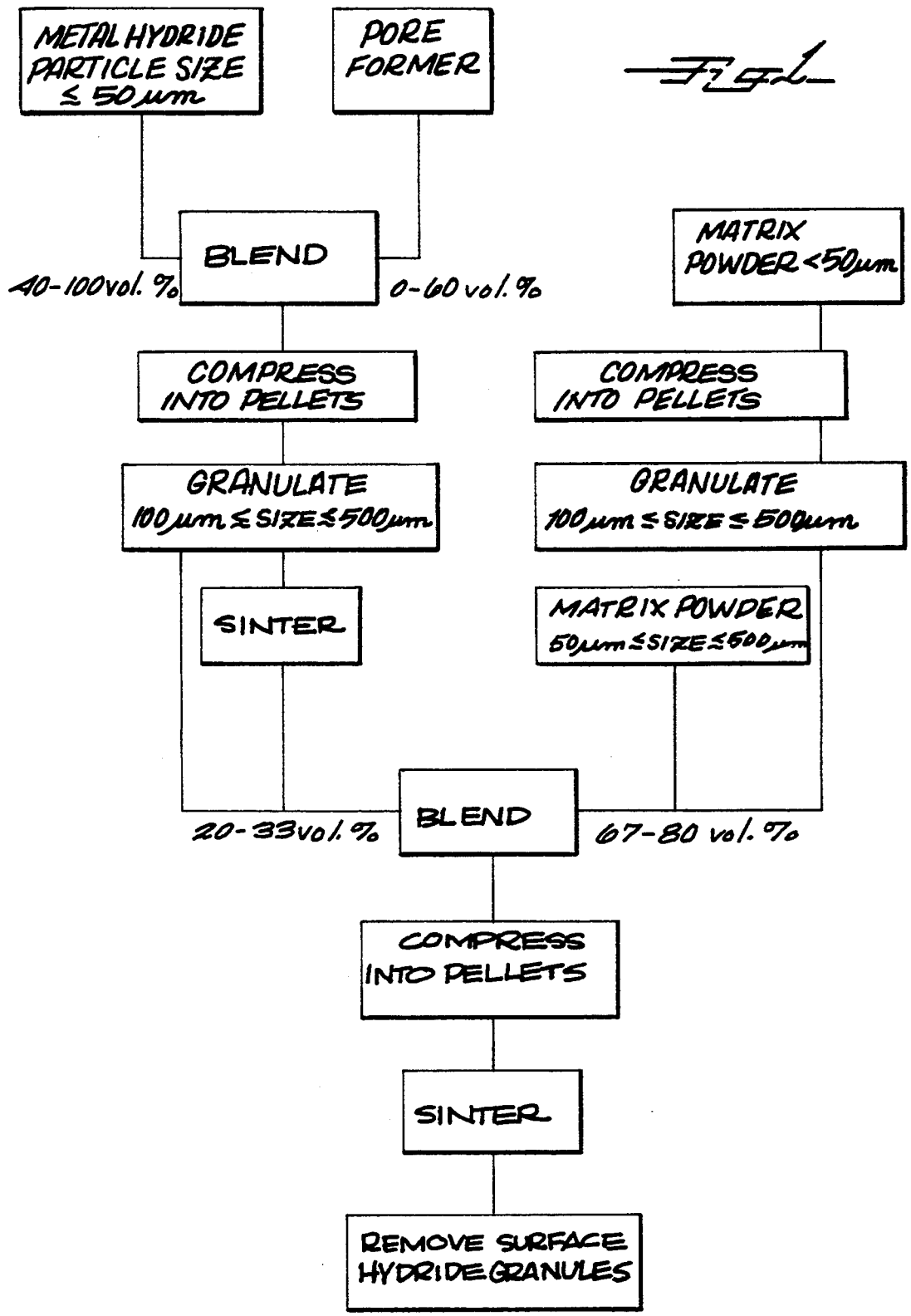

_FIG_2_
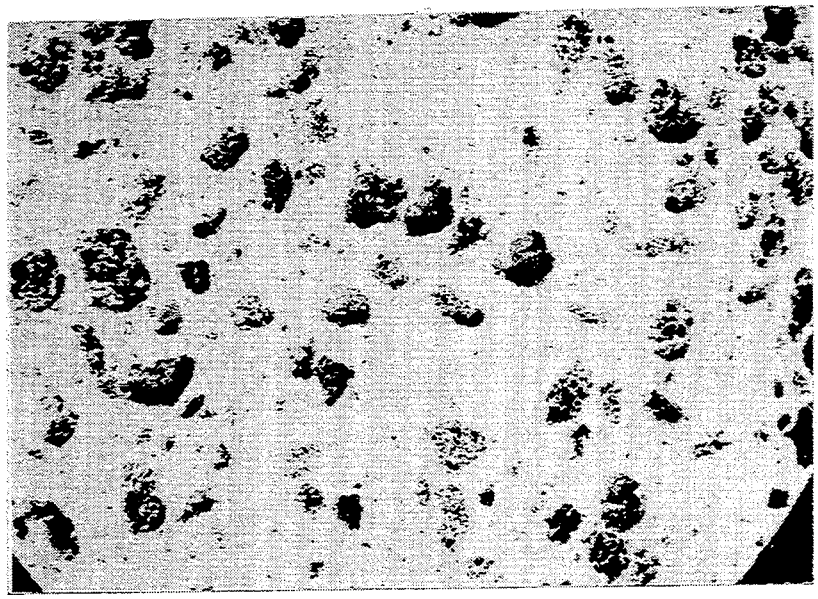
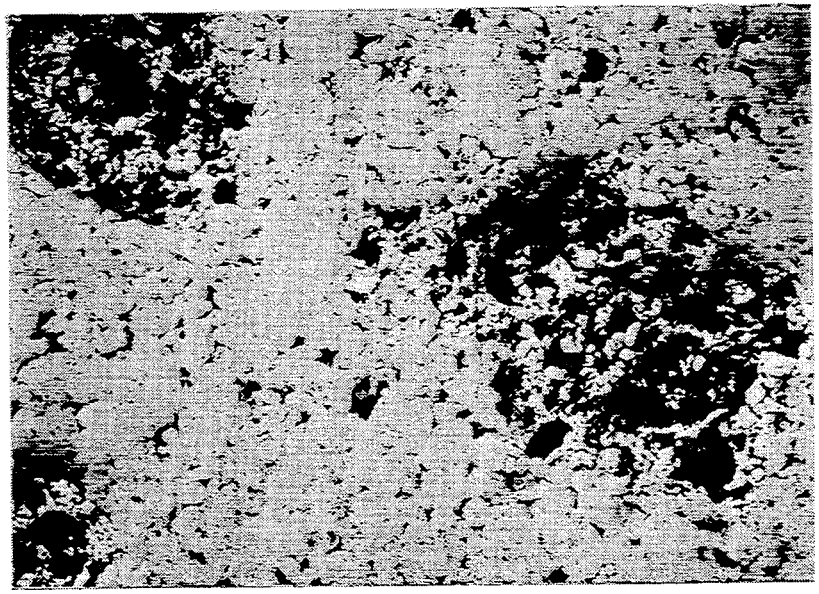
_FIG_3_

METAL HYDRIDE COMPOSITION AND METHOD OF MAKING

BACKGROUND OF THE INVENTION

1. Field of the Invention

The present invention relates to a dimensionally stable metal hydride composition. In particular, the present invention relates to a metal hydride composition that retains the finely-powdered particles that result from repeated hydrogen absorption/desorption cycles in a dimensionally stable matrix, and a method for making such a composition. The United States Government has rights in this invention pursuant to Contract No. DE-AC09-89SR18035 between the U.S. Department of Energy and Westinghouse Savannah River Company.

2. Discussion of Background

Hydride-forming materials that rapidly absorb/desorb large amounts of hydrogen under controlled temperature and pressure conditions are used in heat pumps, batteries, and fuel cells, and for hydrogen storage, pumping, compressing, purifying and isotope separating.

Most elemental metals and many metal alloys are capable of reacting with hydrogen to form a hydride. Known hydride-formers (loosely termed hydrides) include pure metals (Mg, Ti, V, Nb, Pt, Pd, and so forth), alloys, and hydride compositions consisting of a hydridable material mixed with a non-hydridable ballast or matrix. To maximize their surface area and absorption/desorption efficiency, hydrides and hydride compositions are usually supplied in the form of small-grained particles or pellets.

As a metal absorbs hydrogen, it expands and internal stresses cause it to fracture and break apart into smaller pieces, a process called decrepitation. The particle size is reduced with each absorption/desorption cycle until, eventually, the particles disintegrate into a submicron-sized powder ("fines"). The hydride fines compact, conduct heat poorly and do not readily allow hydrogen to permeate so less hydrogen is absorbed during each successive cycle. If the powder becomes entrained in the gas stream, it can migrate and contaminate downstream piping and equipment. Even if filters are used to contain the powder, the fine mesh required for such small particles is easily clogged.

A number of attempts have been made to alleviate these problems. For example, Helversen (U.S. Pat. No. 4,249,654) coats metal hydrides onto the surface of diatomaceous earth, rare earth, porous ceramic, or glass fiber. Baker, et al. (U.S. Pat. No. 4,600,525) adds a lubricant such as TEFLON beads to a powdered hydrogen sorbent alloy to serve as a flow aid. Flow aids prevent compaction by allowing rearrangement and movement of the powders with respect to each other and with respect to the side walls of the container.

More commonly, hydrides are combined with stable, non-hydridable matrix materials to form compositions that are better able to withstand repeated absorption/desorption cycles than hydrides alone. Metal hydrides may be plated with a dissimilar metal (Ishikawa, et al., U.S. Pat. No. 4,717,629) or mixed with non-hydridable matrix metals (Ron, et al., U.S. Pat. No. 4,507,263; Goodell, et al., U.S. Pat. No. 4,6817,650; Bernauer, et al., U.S. Pat. No. 4,310,601; Steyert, et al., U.S. Pat. No. 4,360,569). Ovshinsky, et al. (U.S. Pat. No. 4,431,561) incorporates a light weight rare earth element into a host matrix to increase the numerical density of catalytically active sites for dissociating hydrogen molecules. Roberts, et al. (U.S. Pat. No. 3,803,082) increases the thermal stability of aluminum hydrides by incorporating small amounts of an alkyl or aryl substituted silicol into the hydride lattice. Other hydride compositions are formed by combining a metal hydride with a matrix material such as plastic powder (Steyert, et al., U.S. Pat. No. 4,360,569), compounds such as tin oxide and aluminum oxide (Leppard, U.S. Pat. No. 4,459,270), or polymers (Bernstein, et al., U.S. Pat. No. 4,433,063; Bühl, et al., U.S. Pat. No. 4,110,425; Blytas, U.S. Pat. No. 4,036,944).

Dimensionally stable hydrogen-absorbing compositions and methods for making those compositions are disclosed in two commonly assigned and recently filed patent applications. Application Ser. No. 07/933,152 (Palladium/Kieselguhr Composition and Method), filed 8/21/92, describes a composition made by depositing palladium onto a porous substrate such as kieselguhr from a concentrated solution of tetra-amine palladium (II) nitrate. Application Ser. No. 07/952,931 (Dimensionally Stable Metallic Hydride Composition), filed 09/29/92, describes a composition made by subjecting a metal hydride to one or more hydrogen absorption/desorption cycles to disintegrate the hydride particles. The particles are partly oxidized, then blended with a ballast metal and kieselguhr to form a uniform mixture. The mixture is compressed into pellets and calcined.

Many of these compositions have a relatively low hydride content, and therefore a lower hydrogen-absorbing capability than a pure hydride of the same volume. Furthermore, the expansion of the hydride particles during hydrogen absorption creates very high stresses in the immediate vicinity of the particles. It has proved to be difficult to develop a composition having sufficient strength to accommodate the expansion of the hydride without fracturing, and a porosity high enough to allow the transfer of hydrogen to and from the hydride particles, but low enough to contain the fines produced by repeated cycling.

There is a need for a dimensionally stable hydride composition that can reversibly absorb large amounts of hydrogen. The matrix should have sufficient porosity for the hydrogen to permeate the structure. It should maintain its hydrogen-absorbing capacity over a large number of absorption/desorption cycles, and, preferably, retain substantially all of the hydride fines created during absorption/desorption.

SUMMARY OF THE INVENTION

According to its major aspects and broadly stated, the present invention is a dimensionally stable hydride composition and a method for making such a composition. The composition is made by forming particles of a metal hydride into porous granules, mixing the hydride granules with a matrix material, forming the mixture into pellets, and sintering the pellets in the absence of oxygen. To increase the porosity of the hydride granules, the hydride particles may be mixed with a removable pore former before being formed into granules. Alternatively, the hydride granules are mixed with the matrix material in a viscous slurry. Droplets of the slurry are deposited onion smooth surface, dried and sintered. The sintered pellets are subjected to at least one hydrogen absorption/desorption cycle to disintegrate surface hydride granules, and ultrasonically cleaned to remove the disintegrated hydride.

The final product is a porous, dimensionally stable hydride composition. The porous structure of the granules accommodates the expansion that occurs when the metal hydride particles absorb hydrogen. The porous matrix allows the flow of hydrogen therethrough to contact the hydride particles, yet supports the granules and contains the hydride fines that result from repeated absorption/desorption cycles.

An important feature of the present invention is the metal hydride, preferably a hydride that can be formed into porous granules. The hydride is preferably in the form of particles less than approximately 50 μm in size, most preferably less than approximately 10 μm in size. If desired, two or more hydrides may be blended to form a mixture that is capable of absorbing/desorbing the three isotopes of hydrogen (protium, deuterium, tritium) at approximately equal rates. Hydrides that can be used in the composition include the pure hydrides (Mg, Ti, V, bib, Pt, Pal, and so forth), binary, tertiary, and more complex alloys of La, Al, Cu, Ti, Co, Ni, Fe, Zr, Mg, Ca, Mn, and so forth, and mixtures and other combinations thereof. For example, the hydridable $AB_{5-x}C_x$ alloys, where $0.1 \leq X \leq 1$ and the letters A, B, and C represent elements, can be used in the composition. In particular, the $LaNi_{5-x}Al_x$ alloys such as $LaNi_{4.25}Al_{0.75}$ are usable in the composition.

Another feature of the present invention is the pore former. The hydride particles may be mixed with approximately 60 vol.%, or less, of a removable pore former to increase the porosity of the granules. The optimum amount of the pore former depends on the choice of hydride and matrix material, and is best determined empirically for each combination of hydride, pore former and matrix material.

Still another feature of the present invention is the matrix material. The matrix is preferably supplied in the form of a coarse powder or granules, between approximately 50 μm and 500 μm in diameter. When the mixture of matrix and hydride granules is compressed, the matrix particles flow to form a support structure with low residual stresses that readily accommodates the expansion of the hydride during absorption. Suitable matrix materials for use with the invention include aluminum, nickel, copper, silica and mixtures thereof. If desired, other materials that are chemically compatible with the metal hydride may be used in the practice of the invention.

Another feature of the present invention is the combination of the matrix material and the porous hydride granules. The more hydride granules, the greater the hydrogen-storage capacity of the composition. However, the composition must contain sufficient matrix material to separate the granules from one another and contain the hydride fines produced by absorption/desorption. To ensure that the hydride granules are effectively separated from one another by the matrix, the matrix particles and the granules are preferably in the same size range. The composition contains a volume of matrix material that is at least approximately equal to the volume of the hydride granules, preferably a ratio of matrix material to hydride granules between approximately 2:1 and 4:1 by volume.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a flow chart of a method for making a composition according to a preferred embodiment of the present invention;

FIG. 2 is a photomicrograph at 25X magnification showing hydride granules in a support matrix according to a preferred embodiment of the present invention; and FIG. 3 is a photomicrograph of the structure of FIG. 2 at 250X magnification.

DETAILED DESCRIPTION OF A PREFERRED EMBODIMENT

According to a preferred embodiment of the present invention, a dimensionally stable hydride composition comprises a mixture of porous hydride granules and a matrix material. The composition is made by preparing porous granules of a metal hydride, mixing the granules with particles of a suitable matrix material, compressing the mixture to form pellets and sintering the pellets in the absence of oxygen (FIG. 1).

The porous structure of the granules accommodates the expansion that occurs when the metal hydride particles absorb hydrogen. The granules are surrounded by a dimensionally stable, porous matrix that allows the flow of hydrogen therethrough to contact the hydride particles, yet supports the granules and contains the hydride fines that result from repeated absorption/desorption cycles.

The composition is made generally as follows:

1. Provide a metal hydride in the form of fine particles.

In general, the smaller the hydride particles, the higher their available surface area and the better the absorption/desorption efficiency of the composition. The hydride particles are preferably less than approximately 50 μm, more preferably less than approximately 20 μm, and most preferably less than approximately 10 μm in size.

Particles in the preferred size range are readily obtained by subjecting a metal hydride to one or more hydrogen absorption/desorption cycles to disintegrate the metal into small particles. As used herein, the term "absorption/desorption cycle" refers to subjecting a hydridable material to hydrogen under the appropriate temperature and pressure conditions so that the material absorbs hydrogen, then to desorb the hydrogen, again under the appropriate temperature and pressure conditions.

The decrepitated particles are sieved to obtain particles in the desired size range. Each successive absorption/desorption cycle further reduces the particle size, thus, the number of cycles needed depends on the initial size of the hydride particles, the choice of hydride, and the hydrogen pressure and temperature. If convenient, other methods for forming hydride particles in the desired size range may be used.

Hydrides that can be used in the composition include pure metals such as Mg, Zr, Ti, V, Nb, Pt and Pd. Other suitable hydrides include binary, tertiary, and more complex alloys of La, Al, Cu, Ti, Co, Ni, Fe, Zr, Mg, Ca, Mn, the rare earths, and mixtures and other combinations thereof. By way of example, the hydridable $AB_{5-x}C_x$ alloys, such as $LaNi_{5-x}Al_x$, where $0.1 \leq X \leq 1$ and the letters A, B, and C represent elements, can be used in the composition.

Many hydrides absorb the three isotopes of hydrogen (protium, deuterium and tritium) at different rates. For example, palladium absorbs protium better than deuterium and tritium, and deuterium better than tritium. Vanadium, in contrast, absorbs tritium better than deuterium and protium, and deuterium better than protium.

If desired, the hydride can comprise a mixture that is capable of absorbing/desorbing the isotopes of hydrogen at approximately equal rates. Thus, if hydride "A" absorbs protium twice as fast as it absorbs deuterium, and hydride "B" absorbs deuterium twice as fast as protium, a mixture containing equal amounts of hydrides "A" and "B" will absorb protium and deuterium at equal rates. A mixture of Pd and $ZrFe_{0.5}Cr_{1.5}$ in a ratio of approximately 2:1 by weight absorbs/desorbs all three isotopes at approximately equal rates. Other mixtures suitable for the practice of the invention can readily be determined from the known isotope-absorbing properties of individual hydrides.

2. Mix the metal hydride particles with a removable pore former to form a first mixture.

The porosity of the granules produced in Steps 3-4 is controlled by mixing the hydride particles with a removable pore l0 former, that is, a material that is removed after processing to leave interconnected void spaces (pores). The pores accommodate the expansion of the hydride particles during hydrogen absorption and thereby increase the resistance of the composition to stress caused by repeated absorption/desorption cycles. The increased porosity also allows hydrogen to more readily permeate to the hydride particles.

As used herein, the term "removable" means that the pore former can be removed from the composition without affecting the chemical or structural integrity of the composition, such as by sublimation or evaporation. Many hydrides are easily oxidized or poisoned by reaction with many compounds, especially organic compounds. An effective pore former is therefore one that creates sufficient porosity around the metal hydride particles, does not react with the hydride or the matrix material during processing, and evaporates at a lower temperature than the hydride and matrix material. A suitable pore former for many metal hydrides is ammonium carbonate (($NH_4$)$_2CO_3$) in powder form. Ammonium carbonate is chemically compatible with many metal hydrides, and decomposes slowly at room temperature without affecting the ability of the composition to absorb/desorb hydrogen. Any residual ammonium carbonate is removed from the product by vacuum sintering (Step 9). Other pore formers with similar properties may be used if desired.

Addition of a pore former helps optimize the structure of the composition. The amount of pore former added to the hydride particles depends on the desired porosity of the product. Some hydrides need little or no pore former in order to be formed into granules that retain their structural integrity during processing (Steps 3-9) and are sufficiently porous to accommodate the expansion of the hydride particles during hydrogen absorption. Other hydrides require a pore former to produce sufficiently porous granules. In general, the first mixture contains up to approximately 60 vol. % pore former. The optimum ratio of hydride to pore former depends on the choice of materials, and is best determined by a modest amount of experimentation and observation for each combination of hydride, pore former and matrix material.

Alteratively, the metal hydride particles may be dispersed in an alcohol or water solution of the pore former. The mixture is then dried, leaving the hydride particles coated with the pore former.

3. Compress the first mixture to form hydride pellets.

Compaction pressures up to about 20,000 psi (about $1.4 \times 10^3$ atm or $1.0 \times 10^6$ Torr) are usually sufficient to cause the mixture of hydride particles and pore former (if used) to form a compact, however, higher pressures may be used if needed. Uniaxial pressing generally results in acceptable pellet microstructures. However, depending on the choice of hydride and matrix material, isostatic pressing may be used to achieve a more uniform density or decreased residual stresses. The size and density of the compacted hydride pellets depend on the batch size of starting material and the applied pressure. The optimum pellet density for efficient granulation (Step 4) depends on the choice of hydride and pore former. For example, pellets preferably have a density of at least approximately 3 g/cm$^3$ based on the $LaNi_{4.25}Al_{0.75}$/($NH_4$)$_2CO_3$ system.

4. Granulate the hydride pellets by any suitable means.

The pellets may be crushed, or rolled through a series of sieves of decreasing sizes to produce granules of the desired size. The hydride granules are preferably between approximately 100 $\mu$m and 500 $\mu$m in size, more preferably between approximately 125 $\mu$m and 300 $\mu$m in size. Alternatively, Step 4 may be omitted and hydride granules in the preferred size range may be produced by other means, such as automated dry granulators.

5. Sinter the hydride granules in the absence of oxygen.

Depending on the choice of hydride and the end use of the composition, sintering may be desirable to strengthen the structure of the hydride granules. The sintering temperature should be less than the melting point of the hydride particles, but sufficiently high to heat-treat the pellets for hardening without significant densification. Typical sintering temperatures are approximately 70%-90% of the melting temperature of the hydride as measured in degrees Kelvin.

It is well known that oxygen lowers the hydrogen-storage capacity of hydride-forming materials, to the point that oxidized materials may no longer be hydridable. Therefore, the oxygen content of the hydride particles is minimized by sintering in the absence of oxygen. The optimum sintering time and temperature am best determined by a modest degree of experimentation and observation for each particular hydride.

Sintering at this stage of the process may be omitted if it is determined that sintering the granule/matrix mixture (Step 8) produces a composition with adequate structural strength. The optimum sintering conditions for the hydride granules and the granule/matrix mixture may be different. Therefore, Step 5 is preferably included where needed to optimize the structural strength and performance of the composition. It will be understood that the hydride pellets may be sintered before or after being formed into granules (Step 4).

6. Mix the hydride granules with a particulate matrix material to form a second mixture. Mixing is preferably carried out by a method that does not break up the hydride granules, such as stirring, wire blending, shaking or tumbling.

When the mixture of hydride granules and matrix material is pressed into pellets (Step 7), the matrix particles form a structure that allows permeation of hydrogen through its pores, yet substantially contains the hydride fines produced by numerous absorption/desorption cycles. The matrix material is preferably a substantially non-hydridable material that deforms plastically at relatively low pressures to form a support structure, or matrix, for the hydride granules. Its melting point should be higher than the highest temperature to which the composition will be routinely subjected. The matrix material should also be chemically compatible with the metal hydride, that is, it should not react with the hydride at temperatures that may be encountered during processing or use of the composition.

Typically, hydrides are cooled to absorb hydrogen and heated to desorb hydrogen. The faster the hydride can be cooled and heated, the faster hydrogen is absorbed and released, respectively. Therefore, the matrix material should be a good heat conductor to efficiently transfer heat to and from the hydride.

Suitable matrix materials for use with the invention include aluminum, nickel, copper, alumina, silica and mixtures thereof. If desired, other materials that are chemically compatible with the metal hydride and possess the desired heat transfer and ductility characteristics may be used in the practice of the invention.

It is known that the microstructure of a cold compacted material depends on the form of the material being compressed. Thus, fine powders yield compacts of very fine porosity, which is useful for containing hydride fines. However, compacts formed with fine powders also have large residual fabrication stresses, and the fine porosity creates high internal pressures which lead to cracking during hydrogen absorption/desorption. Matrix structures fabricated directly from very fine powders may show cracking even before use. However, granules made of fine powders may be used in the practice of the invention, as will be described below.

Coarse powders have much better flow characteristics than fine powders, so compacts formed from coarse powders typically have smaller residual stresses. In addition, to ensure that the hydride granules are effectively separated from one another by the matrix material, the matrix particles should be roughly in the same size range as the granules. Therefore, the matrix material is supplied as relatively coarse particles between approximately 50 $\mu$m and 500 $\mu$m in size, preferably between approximately 125 $\mu$m and 300 $\mu$m in size. Alternatively, the matrix material is in the form of a fine powder (particle size $\leq$50 $\mu$m), which is compressed into pellets and granulated to form granules between approximately 100 $\mu$m and 500 $\mu$m in size (FIG. 1). It will be understood that larger and/or smaller matrix particles (or matrix granules) may be used, if such particles are capable of being pressed into a suitable support structure for the hydride granules. The optimum size depends on the choice of matrix material and the size range of the hydride granules, and is best determined empirically for each combination of hydride and matrix material.

The second mixture preferably contains a ratio of matrix material to hydride granules between approximately 2:1 and 4:1 by volume (about 20-33 vol. % hydride granules). However, the optimum volume ratio depends on the choice of matrix material and hydride, and ratios outside this range may be usable with the invention. Similarly, the optimum weight ratio of matrix material to hydride depends on the choice of materials. For example, in a $Cu/LaNi_{4.25}Al_{0.75}$ composition, the ratio of matrix material (Cu) to hydride granules ($LaNi_{4.25}Al_{0.75}$) in the second mixture is preferably about 3:1 by volume and between approximately 4:1 and 6:1 by weight, more preferably approximately 5:1 by weight.

The more hydride granules in the second mixture, the more hydride particles and the greater the hydrogen-storage capacity of the composition. However, the composition must contain sufficient matrix material to contain the fines produced by hydrogen absorption/desorption. The hydride granules are preferably present in the composition as a discontinuous phase, that is, the granules are dispersed in the matrix and separated from one another by the matrix material. For any combination of hydride and matrix material, the optimum matrix:hydride ratio is best determined empirically.

7. Press the hydride/matrix mixture to form pellets,

The pressure needed to form the pellets depends on the choice of hydride and matrix materials. The pellets may be formed in any dimensions appropriate to the intended application, however, relatively small pellets (up to approximately 0.5 cm in diameter) are preferred to minimize the distance which hydrogen must penetrate to be absorbed/desorbed by the hydride particles.

The pellets may be formed by cold compaction or some other suitable technique. The compacted matrix material should be sufficiently dense to support the hydride granules and contain the fines that result from decrepitation, but sufficiently porous for the exchange of hydrogen by the hydride. As will be evident to those of ordinary skill, the microstructure of the compacted matrix depends on the pressure. The choice of compaction pressure is made with a view to obtaining the greatest possible matrix strength while maintaining sufficient open porosity for hydrogen absorption/desorption by the hydride. Preferred compaction pressures are those that yield a compacted matrix material having a density between approximately 80% and 90%, and preferably approximately 85%, of its theoretical attainable density.

8. Sinter the pellets in the absence of oxygen.

If desired, the pellets may be used as pressed (Step 7). However, the matrix structure is strengthened by sintering at a temperature lower than the melting point of the hydride granules and the matrix material, but high enough to result in bonding and heat hardening of the matrix without significant densification or reaction between the matrix and the metal hydride. Sintering is preferably carded out in vacuum to prevent oxidation of the hydride. Preferred sintering temperatures range from approximately 400° C. to over 1000° C., depending on the choice of hydride and matrix material. Therefore, the optimum sintering temperature and time are best determined empirically for each application.

It will be evident that the hydride and the matrix material must be compatible. The sintering conditions must be such that the structure of the hydride granules is unaffected, but the structure of the matrix material is strengthened.

9. Remove exposed metal hydride granules from the surface of the pellets.

Some metal hydride granules are disposed at the surface of the composition. These surface granules decrepitate during cycling to produce hydride fines that, unlike fines produced by wholly-contained granules, are not retained by the matrix structure. These surface fines may be detrimental to the performance of hydride beds when released, particularly in purification and isotope separation processes where it is important to minimize the pressure drop through the hydride bed.

Surface granules are removed by cycling the pellets through one or more absorption/desorptions to decompose the granules to a powder, then removing the powder by ultrasonic cleaning in a water or alcohol bath. After rinsing and drying, the pellets are ready for use. The optimum number of cycles depends on the choice of hydride and the amount of exposed granules. Upwards of 99% of the surface hydrides can be removed by this treatment without damage to the matrix structure. While some of the hydride contained by the pellets is lost, the remaining matrix structure lacks surface hydride granules which might release powdered fines during use. The composition can easily be modified to compensate for the loss of metal hydrides during preparation and cleaning, such as by increasing the proportion of metal hydride granules in the second mixture (Step 6).

Alteratively, pellets containing a mixture of hydride granules and a matrix material (Steps 6-7) may be made by other techniques. As noted above, the matrix must be chemically compatible with the metal hydride and be capable of containing the hydride fines. By way of example, hydride granules may be mixed with a dilute slurry of high alumina cement. The viscosity of the mixture is adjusted so that the metal hydride granules remain in suspension, and droplets of the slurry are deposited onto a smooth, polished surface. After drying, the droplets are outgassed.

The final product is a composition having porous hydride granules dispersed in a matrix structure. The matrix forms a support structure with pores large enough for ready permeation of hydrogen therethrough, but small enough to retain substantially all of the fines produced by repeated cycling. Similarly, the hydride granules are sufficiently porous that hydrogen can permeate therethrough to the individual hydride particles for absorption/desorption. In addition, the void spaces in the granules accommodate expansion of the metal hydride particles during absorption. This reduces stress to the matrix during expansion and increases the resistance of the composition to fracture.

The porosities of the hydride granules and the matrix structure are controlled by the choice of materials, the sintering times, temperatures and atmospheres, and the pressures used for forming the hydride pellets (Step 3) and the composition pellets (Step 7). The optimum conditions for each application are therefore best determined empirically.

The amount of hydrogen that can be absorbed by the composition depends on the choice of hydride and its atom ratio. For example, palladium hydride ($PdH_{0.7}$) has an atom ratio of 0.7, or 0.7 hydrogen atoms per palladium atom. $LaNi_{4.25}Al_{0.75}H_5$ has an atom ratio of 0.83, or 0.83 hydrogen atoms per metal atom. The amount also depends on the temperature and hydrogen pressure: generally, the lower the temperature and the higher the pressure, the greater the amount of hydrogen absorbed by the pellets. Conversely, the higher the temperature and the lower the pressure, the less hydrogen is absorbed.

The following non-limiting examples further illustrate the present invention:

EXAMPLE 1

A lanthanum-nickel-aluminum hydride ($LaNi_{4.25}Al_{0.75}$) was decrepitated by exposure to hydrogen at a pressure of approximately 50 psig at 25° C. The hydride particles thus formed were less than approximately 45 $\mu$m in size; over 98% of the particles were less than 10 $\mu$m in size.

A quantity of ammonium carbonate (($NH_4)_2CO_3$) was ground into a fine powder (particle size less than approximately 45 $\mu$m) and mixed with an approximately equal volume of hydride particles. The mixture contained approximately five parts by weight of hydride particles to one part ammonium carbonate (approximately 83 wt. % hydride and 17 wt. % ammonium carbonate).

The hydride/ammonium carbonate mixture was cold pressed to produce pellets with a density of about 3.5 g/cm$^3$. The pellets were rolled through a series of sieves to produce granules between approximately 150 $\mu$m and 300 $\mu$m in size.

The hydride granules were blended with coarse copper powder (particle size between approximately 150 $\mu$m and 400 $\mu$m) and compacted to form pellets. The ratio of copper:hydride granules in the mixture was approximately 5:1 by weight and 3:1 by volume. The ammonium carbonate was allowed to evaporate for 2-3 days prior to sintering.

The pellets were vacuum sintered at a temperature of about 800° C. for about two hours, hydrided, and cleaned in a sonic bath to remove surface fines. After cleaning, the pellets had a copper:hydride ratio of approximately 6:1 by weight. Typical pellets were approximately 0.5 cm in diameter and weighed approximately 0.5 g. Of course, pellets may be manufactured in any desired size for the intended application. The total weight loss due to evaporation was on the order of 0.04-0.07 g/pellet.

A cross section of such a pellet after hydriding shows $LaNi_{4.25}Al_{0.75}$ hydride granules dispersed as a discontinuous phase in the copper matrix (FIG. 2). The matrix forms a support structure with pores sufficiently large for ready permeation of hydrogen therethrough, but small enough to retain substantially all of the fines produced by repeated cycling. Similarly, the hydride granules are sufficiently porous so that hydrogen can permeate therethrough to the individual hydride particles for absorption/desorption (see FIG. 3). In addition, the voids in the granules accommodate expansion of the metal hydride particles during absorption. This accommodation reduces stress to the matrix during expansion and increases the resistance of the composition to fracture.

EXAMPLE 2

Granules of $LaNi_{4.25}Al_{0.75}$ were produced as described in Example 1. The granules were blended with aluminum powder and compacted to form pellets. The ratio of aluminum:hydride granules in the mixture was approximately 4:1 by weight.

The pellets were vacuum sintered at a temperature of about 700° C., hydrided, and cleaned in a sonic bath to remove surface frees. The pellets had porous $LaNi_{4.25}Al_{0.75}$ granules dispersed in a porous aluminum matrix, similar in appearance to the $Cu-LaNi_{4.25}Al_{0.75}$ composition shown in FIG. 2.

EXAMPLE 3

Granules of $LaNi_{4.25}Al_{0.75}$ were produced as described in Example 1. The granules were blended with nickel powder and compacted to form pellets. The ratio of nickel:hydride granules in the mixture was approximately 5:1 by weight.

The pellets were vacuum sintered at a temperature of about 1100° C., hydrided, and cleaned in a sonic bath to remove surface fines. Cross-sections of the pellets showed porous hydride granules dispersed in a porous nickel matrix.

EXAMPLE 4

A hydride mixture capable of absorbing/desorbing the three isotopes of hydrogen—protium, deuterium, tritium—at approximately equal rates was prepared. The mixture contained Pd and $ZrFe_{0.5}Cr_{1.5}$ particles in a ratio of approximately 2:1 by weight and 1:1 by volume. Hydride granules were prepared as described in Example i, blended with coarse copper powder and compacted to form pellets. The ratio of copper:hydride granules in the mixture was approximately 5:1 by weight and 3:1 by volume.

The pellets were vacuum sintered, hydrided, and cleaned in a sonic bath to remove surface fines. After removal of surface fines, the pellets had a copper:hydride ratio of approximately 6:1 by weight. The pellets had porous $Pd-ZrFe_{0.5}Cr_{1.5}$ granules dispersed in a porous copper matrix, similar in appearance to the structure shown in FIGS. 2 and 3.

It will be apparent to those skilled in the art that many changes and substitutions can be made to the preferred embodiment herein described without departing from the spirit and scope of the present invention as defined by the appended claims.

What is claimed is:

1. A composition for use in absorbing hydrogen, said composition made by a process comprising the steps of:
    forming particles of a metal hydride into granules;
    mixing said metal hydride granules with a removable pore former;
    mixing said hydride granules with a matrix material to form a uniformly blended mixture; and
    forming said mixture into pellets.

2. The composition as recited in claim 1, wherein said process further comprises the step of sintering said hydride granules before mixing said hydride granules with said matrix material.

3. The composition as recited in claim 1, wherein each of said pellets has at least one hydride granule positioned at a surface thereof, and wherein said process further comprises the steps of:
    subjecting said pellets to at least one hydrogen absorption/desorption cycle to disintegrate said at least one hydride granules; and
    removing said disintegrated hydride granules from said pellets.

4. The composition as recited in claim 1, wherein said matrix material is selected from the group consisting essentially of Al, Cu, Ni, alumina, silica and mixtures thereof.

5. The composition as recited in claim 1, wherein said mixing step further comprises mixing one part by volume of said hydride granules with between approximately two to four parts by volume of said matrix material.

6. The composition as recited in claim 1, wherein said matrix material is in the form of particles, said particles being approximately the same size as said hydride granules, and wherein said mixing step further comprises mixing one part by volume of said hydride granules with between approximately two to four parts by volume of said matrix material.

7. The composition as recited in claim 1, wherein said process further comprises sintering said pellets in the absence of oxygen.

8. A process for making a hydrogen-absorbing composition from metal hydride particles, said process comprising the steps of:
    forming said hydride particles into granules ranging in size from approximately 100 μm to approximately 500 μm;
    mixing one part by volume of said hydride granules with between approximately two to four parts by volume of a matrix material, said matrix material being in the form of particles in the approximate range of 50 μm to 500 μm in size;
    forming said mixture into pellets;
    subjecting said pellets to at least one hydrogen absorption/desorption cycle; and
    cleaning said pellets to remove surface fines.

9. The process as recited in claim 8, further comprising the step of forming said matrix material into granules before mixing said matrix material with said hydride granules, said matrix granules being in the approximate range of 100 μm 500 μm in size.

10. The process as recited in claim 8, further comprising the initial step of mixing said hydride particles with a removable pore former, said mixture containing up to approximately 60 vol. % of said pore former.

11. The process as recited in claim 9, further comprising the step of sintering said hydride granules before mixing said granules with said matrix material, said pellets being sintered at a temperature between approximately 70% and 90% of the melting temperature of said hydride particles as expressed in degrees Kelvin.

12. The process as recited in claim 8, further comprising the initial step of subjecting said metal hydride particles to at least one hydrogen absorption/desorption cycle to produce particles less than approximately 10 μm in size.

13. The process as recited in claim 8, wherein said mixing step further comprises mixing one part by volume of said hydride granules with at least approximately two parts by volume of said matrix material.

14. The process as recited in claim 8, wherein said mixing step further comprises mixing said hydride granules with a matrix material selected from the group consisting essentially of Al, Cu, Ni, alumina, silica and mixtures thereof.

15. The process as recited in claim 8, wherein said mixing step further comprises mixing hydride granules with particles of said matrix material, said matrix particles being approximately the same size as said hydride granules.

16. The process as recited in claim 8, further comprising the step of sintering said pellets in the absence of oxygen.

17. A process for making a hydrogen-absorbing composition from metal hydride particles, said process comprising the steps of:
    mixing particles of a metal hydride with a removable pore former to form a first mixture, said particles being less than approximately 50 μm in size;
    forming said first mixture into granules ranging in size from approximately 100 μm to approximately 500 μm;
    mixing said granules with a matrix material to form a second mixture, said matrix material being in the form of particles ranging in size from approximately 50 μm to approximately 500 μm; and
forming said second mixture into pellets.

18. The process as recited in claim 17, further comprising the step of sintering said pellets in the absence of oxygen.

19. The process as recited in claim 8, further comprising the step of forming said matrix material into granules before mixing said matrix material with said hydride granules, said matrix granules being in the approximate range of 100 μm to 500 μm in size.

20. The process as recited in claim 8, further comprising the steps of:
 subjecting said pellets to at least one hydrogen absorption/desorption cycle; and
 cleaning said pellets to remove surface fines.

* * * * *